Figure 1:
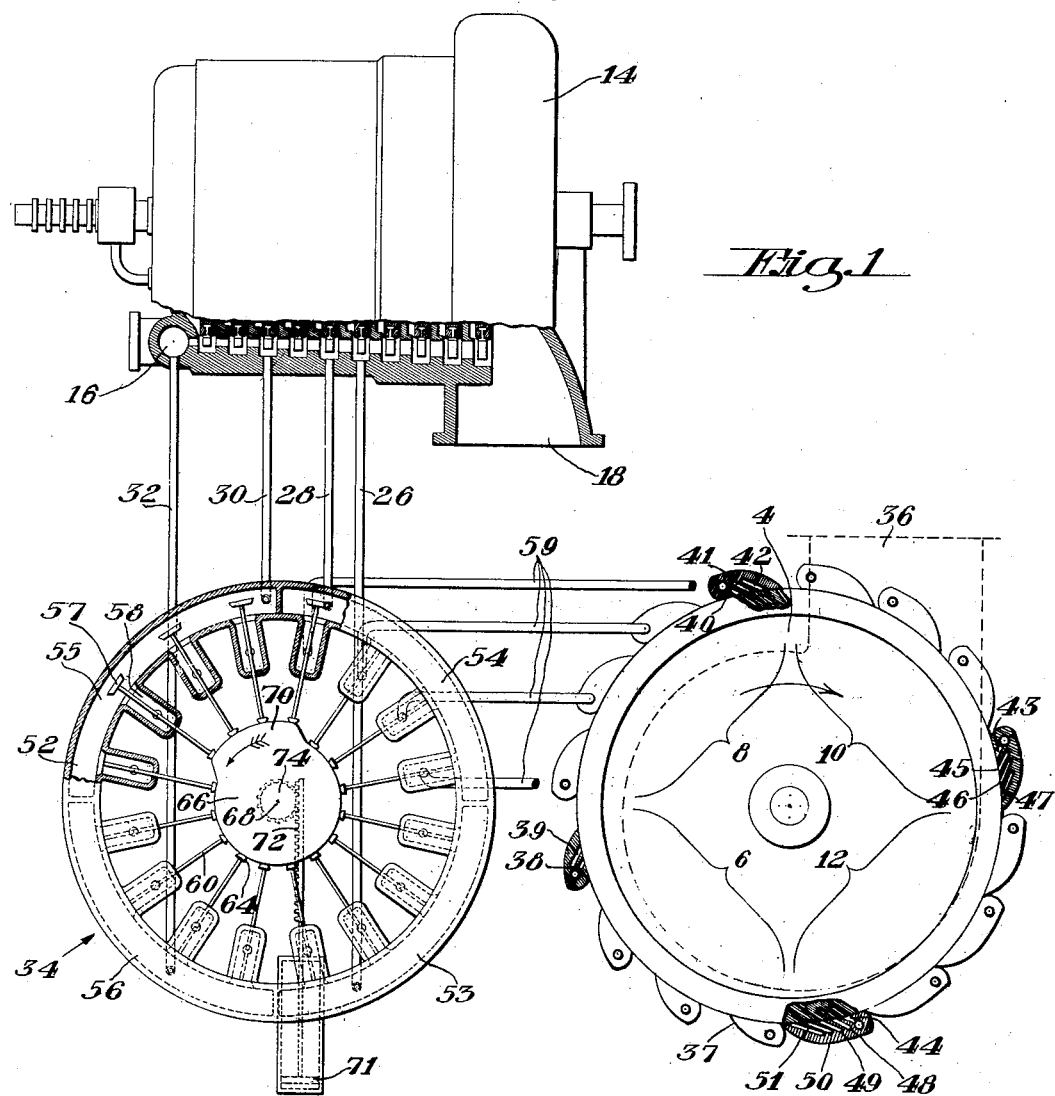

Aug. 15, 1933.     O. D. H. BENTLEY     1,922,074
ELASTIC FLUID TURBINE
Filed May 5, 1928

Witness
Frederick S. Greenleaf

Inventor
Oliver D. H. Bentley
by his attorneys
Van Everen, Fish, Hildreth & Cary Patented Aug. 15, 1933

1,922,074

UNITED STATES PATENT OFFICE 1,922,074

ELASTIC FLUID TURBINE

Oliver D. H. Bentley, Norfolk, Mass., assignor to
B. F. Sturtevant Company, Hyde Park, Mass.,
a Corporation of Massachusetts Application May 5, 1928. Serial No. 275,415

4 Claims. (Cl. 253—56)

The present invention relates to elastic fluid turbines and methods of operating the same and more particularly to turbines adapted for operation at varying speeds.

A common method of controlling the power of a turbine in accordance with the load placed thereon consists in adding or cutting out one or more nozzles for the more substantial changes in the load, smaller variations being taken care of by a throttling of one or more of the nozzles. Such a method is reasonably satisfactory for a constant speed load, such as an electric generator, but is open to the disadvantage of a considerable loss in efficiency when the load is such as to require operation of the turbine at different speeds. An example of the condition of variable speed operation may be found in the auxiliary turbines used in power plant operation for driving the mechanical draft fans. As the load on the station varies, the demand for draft likewise changes and the draft is ordinarily adjusted by running the fans at variable speeds. Inasmuch as the usual turbine employs nozzles all of the same design which operate most efficiently at one and the same speed, there is a decrease in efficiency and a waste of energy when the turbine is called upon to drive the fan at any other speed than that for which the turbine nozzles are best adapted.

It is the object of the present invention to devise an elastic fluid turbine and method of operating the same whereby maximum efficiency will be secured at any one of a number of different speeds.

With this object in view, the present invention comprises a turbine having a plurality of individual nozzle sets, each of which includes one or more nozzles designed to operate the turbine at a particular speed, and with maximum efficiency at such speed. Provision may be made, either automatically or manually, for supplying the fluid to one only of the nozzle sets, and for entirely cutting all of the other sets out of operation. Thus, the turbine may be operated at its maximum efficiency at any one of a number of speeds, depending on the number of sets of nozzles employed; for example, with four separate nozzle sets, the turbine may be run for the best efficiency at any one of four different speeds. When speeds are desired which are intermediate to those for which the separate nozzles are designed, the working fluid may be supplied to a part of the nozzles of the two adjacent sets. This operation necessitates introduction of fluid through nozzles, some of which will not be operating under conditions for optimum performance, and some loss of power will be entailed, but if a sufficient number of nozzle sets is provided, the deviation from best conditions at intermediate speeds will be small. In any event, the efficiency exceeds that possible of attainment in turbines of the usual form, wherein all the nozzles are designed for operation at only one speed. The turbine of the present invention, therefore, operates at maximum efficiency at a plurality of selected speeds, and at only a slight decrease of efficiency at speeds intermediate thereto.

Figure 2:
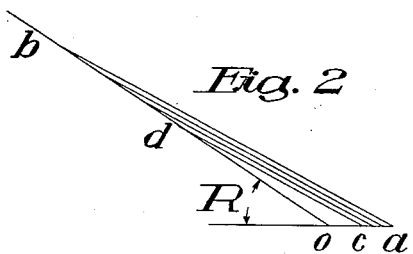
Figure 3:
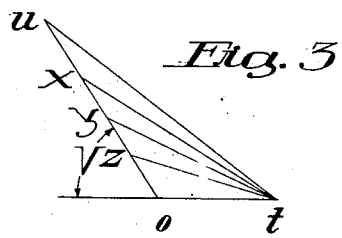

In the accompanying drawing illustrating what is now considered the preferred form of the invention, Fig. 1 is an elevation, partly in section, of the turbine and the control apparatus therefor; Fig. 2 is a vector diagram explanatory of the operation of the turbine at various speeds with the different nozzles; and Fig. 3 is a similar diagram for the nozzle and reversing buckets of a nozzle unit.

In the preferred form of the invention as illustrated and described herein, the turbine is an auxiliary prime mover which is adapted to operate a varying speed load such as a mechanical draft fan. The turbine comprises a plurality of nozzle sets each of which includes a number of nozzles designed to be supplied with steam at a different predetermined pressure from those of the other sets, the expansion ratio of each nozzle being such as to give maximum efficiency at its operating pressure and at a given rotor speed. For operation at any one of the selected speeds for which the nozzles are designed, means are provided for connecting one only of the nozzle sets with the steam supply at its best operating pressure and for cutting all other nozzle sets out of operation. For operation at other speeds, means are provided for supplying nozzles of adjacent sets, but at pressures which are slightly off the optimum operating values.

Referring to the drawing, the illustrated embodiment of the invention comprises an auxiliary turbine 4 having four nozzle sets illustrated generally at 6, 8, 10 and 12. The turbine is operated by steam supplied through take-offs or "bleeders" connected into the casing of the main turbine 14 which has a steam inlet 16 and an outlet 18. These take-offs or "bleeders" for the auxiliary turbine are made at four points in the main turbine casing, as shown by the conduits 26, 28, 30 and 32, which are adapted for connection respectively with the nozzle sets 6, 8, 10, and 12, through the automatic valve mechanism indicated generally at 34. Thus the conduit 32 supplies the auxiliary turbine with the steam at the full pressure supplied to the main turbine, the nozzle sets 12 being designed with the proper expansion ratio for such pressure. The conduit 26 receives steam at a considerably lower pressure and the nozzle set 6 supplied thereby has the correct expansion ratio for such lower pressure. The conduits 28 and 30, bleeding the main turbine at zones of intermediate pressure, are adapted for connection with the intermediate speed nozzles 8 and 10, respectively, each of which has the proper expansion ratio for the particular pressure of steam supplied thereto. The turbine operates a variable speed load, shown as a fan 36.

Each nozzle set comprises four nozzle heads or units 37 each having a nozzle and one or more reversing buckets arranged at an inclination with respect to the buckets of the rotor. The nozzle set 6 which is designed for the lowest speed of operation, comprises nozzle heads or units each having a small nozzle 38 and a single reversing bucket 39. The nozzle is designed with a small expansion ratio for receiving the steam at a low pressure stage of the main turbine. Assuming the steam pressure to be thirty-five pounds per square inch and the turbine as exhausting into the atmosphere, the expansion ratio (i. e. ratio of mouth area to throat area) of this nozzle would be 1.25.

The nozzle set 8 similarly comprises four nozzles 40, but with a higher expansion ratio. For example, if the steam pressure for this nozzle was seventy-five pounds, the expansion ratio would be 1.7. These nozzle sets preferably have two reversing buckets 41 and 42.

Similarly, the nozzles 43 and 44 of the sets 10 and 12 respectively, have increasing expansion ratios, for example, 2.45 and 5.5 respectively, for accommodation to the conditions of the higher steam pressures of 145 and 400 pounds. These nozzle units have three and four reversing buckets respectively, namely, 45, 46, 47 and 48, 49, 50 and 51.

The sizes of the nozzles in the various sets are determined by the amount of steam which it is necessary to pass for supplying the load at their various speeds. Thus, the nozzles 38 of the low pressure set 6 may be of small size, while the nozzles 40, 43 and 44 of the higher pressure sets are of progressively increasing area. The nozzles of each particular set, however, are preferably identical, not only as to expansion ratio, but also as to size.

The valve mechanism 34 for supplying the steam to the different nozzle sets, comprises an annular fluid distributor 52 divided into four separated chambers 53, 54, 55 and 56, communicating respectively with the conduits 26, 28, 30 and 32 leading from the main turbine. Each of the chambers includes a set of four valves 57, the separate valves controlling the flow of steam into inwardly extending valve chambers 58 which communicate with the separate nozzles of the various sets by corresponding groups of conduits. Only one set of these conduits, indicated at 59, is shown in the drawing. The chamber 54 is adapted for communication with any or all of the conduits 59 which lead to the intermediate pressure nozzles 41, these nozzles being thereby supplied with steam bled from the main turbine through the connection 28. Similarly, the other nozzles of the sets 6, 10 and 12 are adapted to be supplied through their respective conduits by steam from the connections 26, 30 and 32. The connections are such that each nozzle can be supplied with steam at only one pressure, namely, the pressure for which the expansion ratio of the nozzle is correct.

The actuating means for the valves is constructed to maintain four nozzles in operation at all times. Thus at low speed, the four nozzles of set 6 are supplied with steam through the chamber 53, the twelve valves in the other three chambers remaining closed. If it is desired to increase the speed slightly, one valve in the chamber 53 will be closed and one valve in the chamber 54 will be opened. As demands for higher speed are made, the low pressure nozzles of set 6 are successively cut out and the higher pressure nozzles of the set 8 are cut in, until only the four nozzles 41 of set 8 are being supplied. Similarly upon further increases of speed, higher pressure nozzles of the sets 10 and finally 12 are successively cut in, and the lower pressure nozzles cut out, until the demands are such as to run the turbine at full load under the four nozzles of the set 12 alone.

The foregoing operation of the valves is effected in the following manner: Each valve has a stem 60 passing through the depending valve chamber 58. On the bottom of each valve stem is a cam follower 64 engaged by a rotatable cam 66 on a shaft 68 concentric with the distributor 52. The cam has a high part 70, sufficient in size to maintain four valves lifted at all times. The remaining twelve valves are maintained closed by springs or other suitable means.

The cam shaft may be operated by hand but preferably is controlled by any usual or preferred form of apparatus of the type employed for automatic draft control in modern power plants. This apparatus is illustrated as a pressure operated piston 71 which raises and lowers a rack 72 in accordance with the demands made upon the plant. The motion of the rack 72 is transmitted through a gear 74 to rotate the cam shaft. The cam travels in the direction of the arrow when an increase in turbine speed is necessary and in the opposite direction for a decreasing speed. In the particular position shown in Fig. 1, the cam is holding open one valve in the chamber 54 and three valves in the chamber 55, permitting steam to be supplied to one nozzle of the set 8 and three nozzles of the set 10, from the steam supply conduits 28 and 30 respectively. A slight movement of the cam in the direction of the arrow will open all valves in the chamber 55, and permit all other valves to close, thereby operating the nozzle set 10 exclusively. In this manner, four valves are always open and the speed and power input to the turbine are determined by the nozzles in service and the pressure applied thereto.

For the most efficient operation of the turbine not only must the nozzles be designed with the proper expansion ratio for the particular steam pressure with which they are employed, but they must also have the proper inclination with respect to the rotor buckets so that the steam issuing from the nozzle will enter the bucket without abrupt change of direction. This angle of inclination will depend upon the steam velocity and also upon the rotor speed. The higher the steam velocity, the rotor speed remaining constant, the smaller will be the inclination of the nozzle with respect to the rotor bucket, and the higher the rotor speed, the steam velocity remaining constant, the greater will be the inclination of the nozzle with respect to the rotor bucket.

In my companion case filed May 5, 1928, Serial No. 275,416, there is shown and described a variable speed turbine all the nozzles of which operate under the same steam pressure, the nozzles of each speed set having a different inclination from those of all the other speed sets. While the inclination of the nozzles of such different speed sets must necessarily be different where the nozzles are all operating from the same steam pressure, it is possible where different steam pressures are used for the different sets by the proper selection of steam pressure and rotor speed to design the nozzles all with the same inclination yet operating at maximum efficiency.

In the present application this has been done, and while the nozzles of each speed set has a different expansion ratio from the nozzles of every other set, they all have the same inclination and all operate with maximum efficiency at the particular speed for which they are designed. The construction and operation of the variable speed turbine of the present application is illustrated in the vector diagram of Fig. 2, in which illustration the horizontal line $oa$ represents the absolute peripheral speed of the rotor. This may be assumed to be the full speed of the turbine with the nozzle sets 12 in operation. The absolute velocity of the steam under the 400 pounds pressure and with the 5.5 expansion ratio will be represented by the vector $ba$, which makes with the vector $oa$ an angle $bao$ which is the angle of inclination of the nozzle axis with respect to the tangent to the rotor. The relative velocity of the steam with respect to the rotor is the difference of the vectors $ba$ and $oa$ represented as the vector $bo$ making with the horizontal an angle R. For most efficient operation this angle should be the same as the angle of inclination of the buckets with respect to the tangent.

In a similar manner, a vector diagram may be constructed for one of the other nozzle sets, say the low speed set 6. This lowest speed of the rotor will be represented by the horizontal vector $oc$. If the same inclination of the nozzle is to be used in these nozzle sets 6 as in the high speed nozzle sets 12, an angle $dco$ must be the same as the angle $bao$. The angle between the relative steam velocity and the horizontal vector is to be the same and equal to R, that is, the relative velocity represented by a vector should have the same inclination to the rotor. Therefore, the absolute steam velocity must be selected such that $d$ falls upon the vector $bo$. That is to say, the nozzle 6 must be operated under such steam pressure with the proper expansion ratio as to give an absolute steam velocity $dc$. With this condition fulfilled, and with the rotor driven at peripheral speed $oc$, the nozzles of the sets 6 will have the same inclination as the nozzles of the sets 12, and the nozzles of both sets will operate at maximum efficiency.

The steam capacity of the nozzle sets 6 can, of course, be easily adjusted by making the nozzles larger or smaller, or putting in or taking out an extra nozzle to secure the desired peripheral speed $oc$ of the rotor. Similarly, the steam capacity of the nozzle sets 8, 10 and 12 will be adjusted by size or number to secure the particular peripheral rotor speed for which each nozzle set is designed to operate.

As stated above, this vector diagram shows the conditions of operation only when any single group of nozzle sets is operated to the exclusion of the other sets. When speeds intermediate to those capable of being given by any one of the independent nozzle sets are desired, it is necessary to use nozzles of two adjacent sets. That is to say, for a speed intermediate to those given by the nozzles 6 and by the nozzles 8, it is necessary to cut out one or more of the nozzles 6 and cut in a corresponding number of the nozzles 8. In this case, the compounded vectors of the absolute velocity of the steam will not give a relative velocity making the angle R with the horizontal. The absolute steam velocity in the high pressure nozzles will be slightly too large to compound properly with the bucket velocity, and the absolute velocity of the steam in the low pressure nozzles will be somewhat too small. Some loss of efficiency is thereby entailed at intermediate speeds. This loss of efficiency may obviously be reduced by using a large number of sets of nozzles so that the deviation from best operating conditions will be small. In fact, with four stages as in the illustrated embodiment of the invention, the loss of efficiency through failure to attain exact compounding of velocities at intermediate speeds is practically negligible. It is to be noted that there is practically no throttling of the steam in any case. The only throttling which is likely to occur takes place during a transition period when one valve is being closed and another is being opened.

While it is possible by proper coordinate selection of the rotor speeds and steam velocities to secure the same inclinations for all of the nozzles of the turbine with maximum efficiency of operation, this does not hold good with respect to the reversing buckets of several nozzle sets. With these reversing buckets just as with the nozzles themselves, for maximum efficiency of operation there must be proper relative inclination of steam delivery and steam receiving channels. With reduction in velocity of the steam in each successive reversing bucket of a nozzle there is required a corresponding alteration in inclination, since the inclination of the rotor bucket and its speed remain unchanged. This reduction in velocity of the steam as it is discharged from each reversing bucket successively requires for maximum efficiency that the inclination of such buckets be changed nearer and nearer toward the tangent.

In Fig. 1 is shown in section one nozzle unit of each of the four nozzle sets. In such sectional views are shown not only the varyingly expanding and similarly inclined nozzles, but also the varyingly inclined reversing buckets. Thus the single reversing bucket 39 of the nozzle unit in set 6 is inclined more nearly at a tangent than is the nozzle 38 of such unit. The reversing buckets 41 and 42 of the unit of the set 8 have progressively more inclination toward the tangent than the nozzle 40 of such unit. And similarly the reversing buckets 45, 46 and 47 in set 10, and the buckets 48, 49, 50 and 51 in set 12 are each progressively inclined nearer the tangent.

For the purpose of illustration, the inclinations of the reversing buckets have been exaggerated both with respect to each other and also with respect to their nozzles. The exact inclination in each instance would be determined by the conditions of steam velocity and rotor speed, and hence the inclinations of the corresponding buckets in the several sets would necessarily all be different.

In the vector diagram shown in Fig. 3 is illustrated the construction and operation of the nozzle and reversing buckets of a nozzle unit in the nozzle sets 10. The horizontal vector $ot$ represents the peripheral rotor speed, the vector $tu$ the absolute steam velocity of the nozzle, and the vector $uo$ the relative steam velocity with respect to the rotor. The angle V represents the inclination of the rotor bucket from the tangent, and the angle $uto$ shows the inclination of the nozzle to such tangent.

Inasmuch as the rotor velocity is the same for the nozzle and all the reversing buckets of a single unit, the horizontal vector $ot$ will be the same for all of the reversing buckets. The angle V of the rotor buckets will also remain constant. The several vectors $tx$, $ty$ and $tz$ represent the absolute steam velocities of the discharge from each of the reversing buckets 45, 46 and 47, and the angles of inclination of these reversing buckets will be $xto$, $yto$ and $zto$ respectively.

It is obvious that given the rotor velocity and the absolute steam velocity from each reversing bucket it is a simple matter to determine these several angles of the reversing buckets such that the points $x$, $y$ and $z$ will all fall upon the vector $uo$, thus giving the same angle V for the nozzle vector $uo$ and for each of the reversing bucket vectors $xo$, $yo$ and $zo$. As already pointed out, when the angle V equals the angle of the rotor buckets, the maximum efficiency of operation is secured.

Except where so specifically set forth in the claims, the present invention is not limited to a construction in which the axis of each of the nozzles has the same inclination. Nor is the invention necessarily limited to a construction in which steam is supplied to the nozzles at different pressures with corresponding variations in expansion ratio in different nozzles.

In its broader aspects the present invention contemplates the provision of a plurality of nozzles or sets of nozzles, each arranged for operation independently by itself and each designed with respect to its expansion ratio, inclination, and size to operate the rotor at a particular speed, each different from the others, with maximum efficiency at each such speed. The invention further contemplates operation of the turbine with nozzles of different sets to obtain speeds intermediate to the selected speeds for which the separate sets are particularly constructed.

Although the invention has been shown and described as embodied in a turbine having four sets of four nozzles each, the invention is not limited to this particular arrangement, but may include any number of nozzle sets, each set having one or more nozzles, except where a more limited construction is specifically defined in the claims.

Nor is the present invention limited, except where so specified in the claims, to a construction in which the nozzle units are provided with redirecting or reversing buckets. While the feature of varying the inclination of the reversing buckets of the several nozzle units and nozzle sets is shown and described in the present application it is not claimed herein, except in the specific arrangement in which it is embodied, being broadly claimed in my companion application Serial No. 275,416, filed May 5, 1928.

Having thus described the invention, what is claimed is:

1. The combination with a variable speed driven element having a characteristic such that the driving power is a function of speed, of an elastic fluid turbine having a rotor with buckets and a plurality of individual sets of nozzles, each set of nozzles being of a capacity to supply fluid to drive the turbine and the driven element at a selected speed, sources of fluid at different pressures, means for separately connecting the separate sources with the separate nozzle sets, the nozzles of the several sets having different expansion ratios so as to deliver the fluid from their respective sources at different absolute velocities, but at relative velocities all of which have the same inclination to the rotor at the selected speeds.

2. The combination with a variable speed driven element having a characteristic such that the driving power is a function of speed, of an elastic fluid turbine having a rotor with buckets and a plurality of individual sets of nozzles, each set of nozzles being of a capacity to supply fluid to drive the turbine and the driven element at a selected speed, sources of fluid at different pressures, means for separately connecting the separate sources with the separate nozzle sets, the nozzles of the several sets having different expansion ratios so as to deliver the fluid from their respective sources at different absolute velocities which, when compounded with the peripheral speed of the rotor, give relative velocities with respect to the rotor at the same inclination as that of the rotor buckets.

3. The combination with a variable speed driven element having a characteristic such that the driving power is a function of speed, of an elastic fluid turbine having a rotor with buckets and a plurality of individual sets of nozzles, each set of nozzles being of a capacity to supply fluid to drive the turbine and the driven element at a selected speed, sources of fluid at different pressures, means for separately connecting the separate sources with the separate nozzle sets, the nozzles of the several sets being of the same inclination to the rotor and having different expansion ratios so as to deliver the fluid from their respective sources at different absolute velocities, but at relative velocities all of which have the same inclination to the rotor at the selected speeds.

4. The combination with a variable speed driven element having a characteristic such that the driving power is a function of speed, of an elastic fluid turbine having a rotor with buckets and a plurality of individual sets of nozzles, each set of nozzles being of a capacity to supply fluid to drive the turbine and the driven element at a selected speed, sources of fluid at different pressures, means for separately connecting the separate sources with the separate nozzle sets, the nozzles of the several sets having different expansion ratios so as to deliver the fluid from their respective sources at different absolute velocities, but at relative velocities all of which have the same inclination to the rotor at the selected speeds, and control means for connecting two sources with nozzles of their respective sets for operation at speeds intermediate to the selected speeds.

OLIVER D. H. BENTLEY.